United States Patent [19]

McKinnon

[11] Patent Number: 4,608,858

[45] Date of Patent: Sep. 2, 1986

[54] PNEUMATIC TEST PLUG

[76] Inventor: Robert M. McKinnon, P.O. Box 648, Bedford, Tex. 76021

[21] Appl. No.: 668,624

[22] Filed: Nov. 5, 1984

[51] Int. Cl.$^4$ .............................................. G01M 3/02
[52] U.S. Cl. ........................................ 73/49.8; 138/93
[58] Field of Search ...................... 73/49.8; 138/93, 90

[56] References Cited

U.S. PATENT DOCUMENTS

| 2,753,876 | 7/1956 | Kurt | 138/93 X |
| 3,120,859 | 2/1964 | Wakley | 138/93 |
| 4,460,019 | 7/1984 | Condon | 138/90 |

FOREIGN PATENT DOCUMENTS 589346  1/1978  U.S.S.R. ................................ 138/93

Primary Examiner—Stewart J. Levy
Assistant Examiner—Joseph W. Roskos
Attorney, Agent, or Firm—Arthur F. Zobal

[57] ABSTRACT

The test plug is used for testing water or sewer lines for leaks. It comprises a hollow inflatable bulb attached to a handle. The bulb has an opening in fluid communication with an aperture extending through the handle. The bulb is inserted into the opening of the line and air under pressure is injected into the bulb to cause it to inflate to form a seal in the line for test purposes. After the test, the bulb is deflated and removed from the opening. The bulb has a plurality of ridges on its inside to cause the bulb to return to its original shape upon deflation. The ridges are in two sets. One set of ridges are in spaced apart lines, each of which extends from near the opening of the bulb to the opposite end thereof. The other set of ridges are in spaced apart lines each of which extends continuously around the inside of the bulb near the end opposite its opening.

11 Claims, 7 Drawing Figures

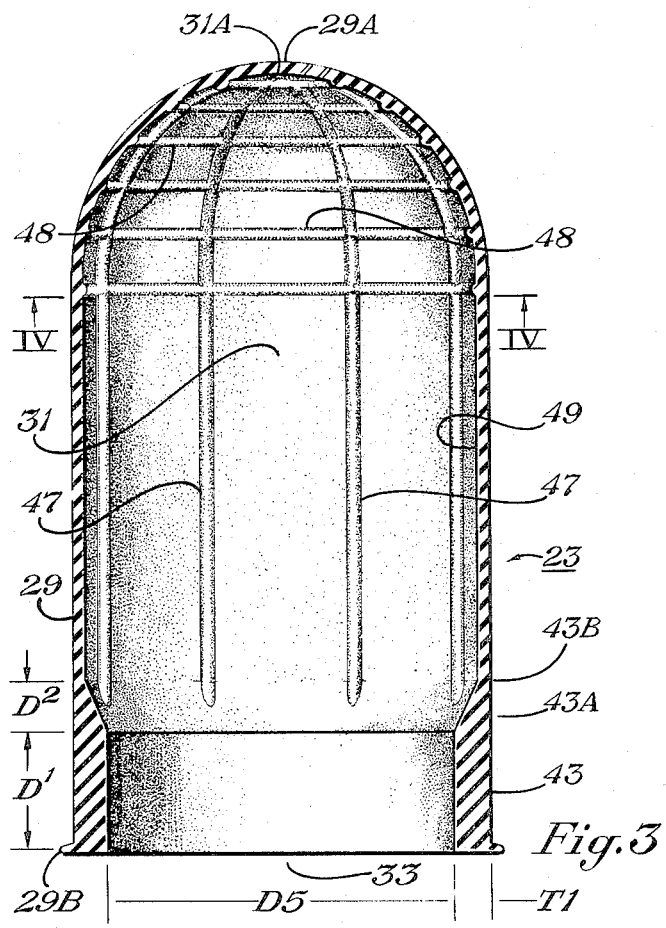
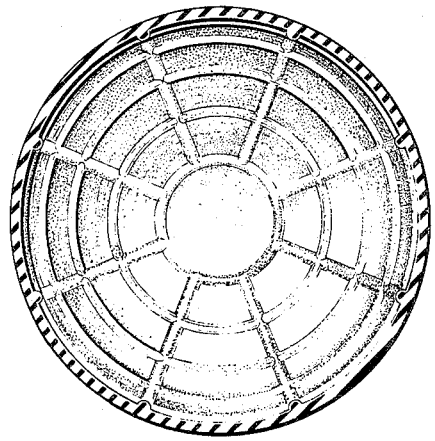
Fig.3
Fig.4

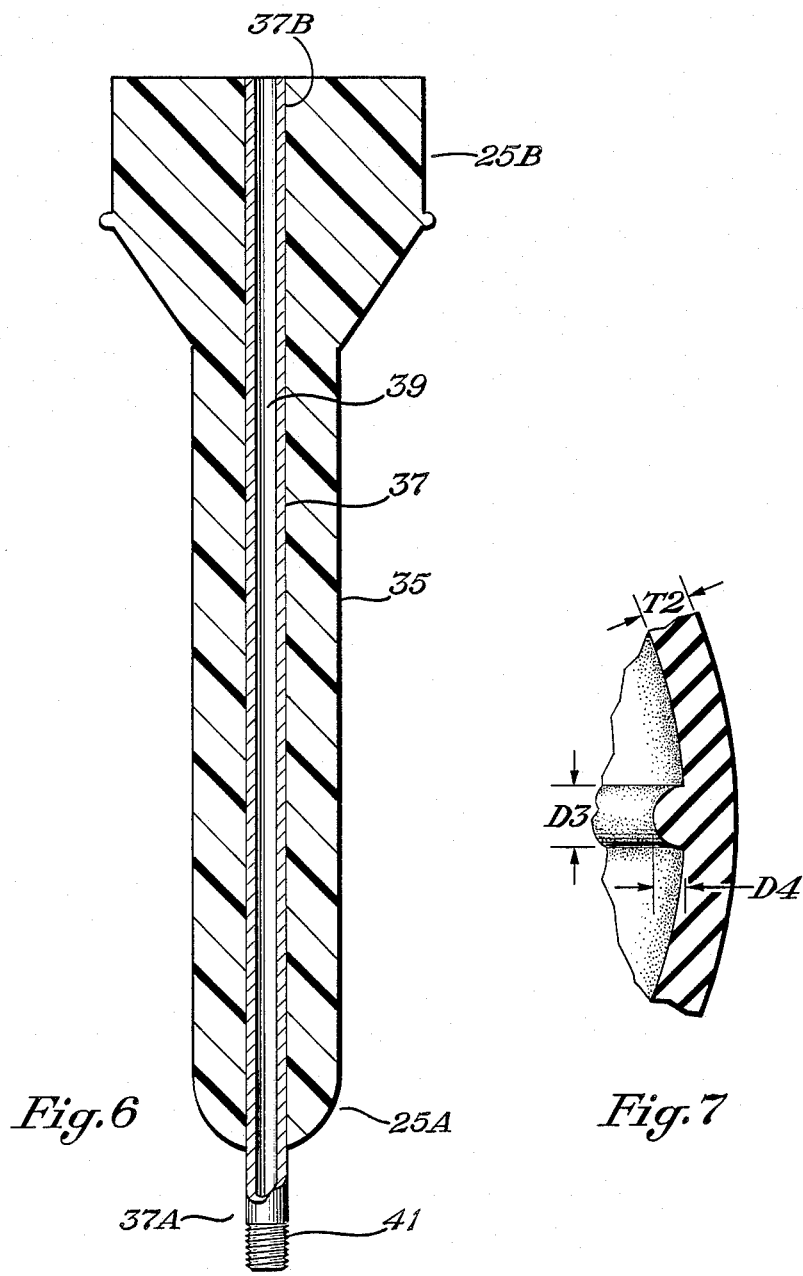

PNEUMATIC TEST PLUG

BACKGROUND OF THE INVENTION

1. Field of the Invention

This invention relates to a pneumatic test plug for use for testing water or sewer lines for leaks.

2. Description of the Prior Art

There are a number of different types of pneumatic test plugs in use for testing water or sewer lines for leaks. U.S. Pat. Nos. 2,843,154, 3,129,726, and 4,203,473 disclose several types of pneumatic test plugs. The known pneumatic test plugs on the market have ridges on the outside as shown in U.S. Pat. Nos. 2,843,154 and 4,203,473 (FIG. 9) for enhancing deflation when the air pressure is released. The exterior ridges prevent the plug from being used to test the T of a test pipe whereby the plug is used to test the pipe above the T. This requires one to place his hand up into the pipe for locating and removing the plug and also for disconnecting and connecting the air pressure tube from and to the plug after inflation and for deflation purposes. This presents problems in that the plug may explode and damage one's hand or the plug may be inadvertently left up in the pipe in an inflated position causing subsequent fluid flow problems. In addition, the known pneumatic test plugs do not inflate properly for effective sealing and/or become distorted upon deflation when used in the T. The distortion makes it difficult to remove the plug from the test opening and to reinsert the plug in another test opening which reduces its effectiveness for subsequent use.

SUMMARY OF THE INVENTION

It is an object of the invention to provide a new and useful pneumatic test plug for use for testing water or sewer lines and which inflates properly for effective sealing and deflates without distortion.

The plug comprises an inflatable member comprising wall structure formed of flexible material defining a chamber with an opening leading to said chamber. Means is provided for allowing gas under pressure to be injected into said chamber by way of said opening to cause said member to inflate and subsequently to be released from said chamber by way of said opening to allow said member to deflate. The inside of said wall structure comprises a plurality of ridges of said flexible material projecting inward from the inside of said wall structure for causing said member to retain its original shape upon deflation thereof.

In a further aspect said ridges comprise two sets of ridges. One set of ridges are in spaced apart lines, each of which extends from near said opening to the end of said chamber opposite said opening. The other set of ridges are in spaced apart lines, each of which extends continuously around the inside of the wall structure of said member.

In the embodiment disclosed, a handle having an aperture extending therethrough is coupled to said member with said aperture in fluid communication with said chamber by way of said opening.

BRIEF DESCRIPTION OF THE INVENTION

FIG. 3 is a cross-sectional view of a bulb of the invention.

FIG. 4 is a cross-sectional view of FIG. 3 taken along the lines 4—4 thereof. In FIG. 4, the circular ridge next to the closest circular ridge on the inside of the bulb cannot be effectively seen due to its position.

FIG. 6 is a partial cross-sectional view of the handle of FIGS. 1 and 5.

FIG. 7 is an enlarged partial view of FIG. 4 illustrating one of the interior ridges of the bulb.

DESCRIPTION OF THE PREFERRED EMBODIMENTS

Figure 1:
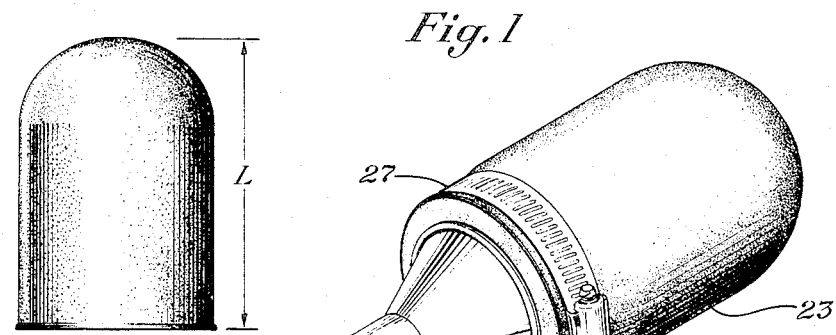
FIG. 1 is a perspective view of the exterior of the pneumatic test plug apparatus of the invention.
Figure 2:
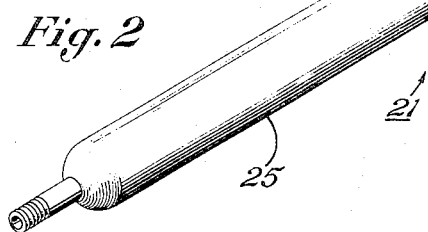
FIG. 2 is a side view of the bulb of FIG. 1.
Figure 5:
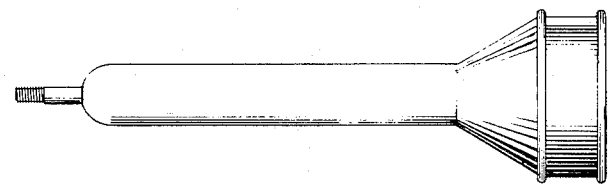
FIG. 5 is a side view of the handle of the apparatus of FIG. 1.

Referring now to the drawings, the test plug apparatus of the invention is identified at 21. It comprises an inflatable bulb or member 23 attached to a handle 25 by a clamp 27. The member 23 is formed of molded natural rubber and comprises wall structure 29 defining a chamber 31 with an opening 33 leading to the chamber 31. Handle 25 is a stiff or rigid member formed of molded polyethylene 35 with a metal tube 37 embedded therein defining an aperture 39 extending through the handle. The end 37A of the tube 37 extends out of the end 25A of the handle 25. It is threaded at 41 and has a conventional pneumatic valve located therein which is not shown in the drawings. The pneumatic valve is of the type employed in the stem of an automobile tire. The enlarged end 25B of the handle 25 and hence the end 37B of the tube 37 are located in the opening 33 and the member 23 is secured to the end 25B of the handle by tightening the clamp 27 around the neck or end 43 of the member 23.

In using the test plug, the bulb 23 is inserted into the opening of a test T connection of a water or sewer pipe forming part of a fluid system of a house or building and inflated to fill the T connection thereby forming a seal in the pipe at the T. The bulb 23 is inflated by attaching a hose of an air pump to the threaded end 37A of the tube 37 and injecting air under pressure into the chamber 31 by way of the aperture 39 and hence by way of the opening 33 to seal the line at the test connection. The air pressure employed may be of the order of 15 p.s.i. and not greater than 25 p.s.i. The piping system is then filled with water for a period of 24 hours to determine if any leaks are present. During this time, the air pump can be disconnected from the end 37A of the tube 37 and the pneumatic valve in the tube 37 seals the tube. After the test period, the bulb 23 is deflated by pushing in on the stem of the pneumatic valve at the end of the tube 37 to release the air pressure from the chamber 23.

In order to allow the bulb 23 to inflate properly to form an effective seal in the pipe at the T, the bulb 23 is formed of natural rubber and the wall structure 29 from 43A to the end 29A forming the chamber 31 is relatively thin in cross-section. The exterior of the expandable portion of the wall 29 of the bulb 23 is smooth and free of ridges whereby the bulb may be located in the opening of the test T and inflated to effectively form a seal with the upper and lower pipe portion of the T as well as with the flange opening of the T. When the bulb is inflated in the T, the handle 25 will extend out of the opening as a reminder that the bulb is in place, thereby preventing one from inadvertently leaving the bulb in the pipe. Since the bulb 23 is not inserted upward into the pipe of the T, the dangers associated with the bulb exploding and injuring ones hand are minimized.

In order to prevent distortion of the wall portion 29 of the bulb 23 and to cause it to return to its original shape upon deflation, two sets of ridges 47 and 48 are formed on the inside 49 of the wall 29. In the embodiment of FIGS. 3 and 4, eight equally spaced apart ridges 47 are employed. Adjacent ridges 47 are spaced 45 degrees apart. They project inward from the inside 49 of the wall 29 and extend from the position 43A of the neck 43 near the opening 33 to the end 31A of the chamber 31 opposite the opening 33. Six spaced apart circular ridges 48 are employed. They project inward from the inside 49 of the wall 29 and are located near the end of the chamber 31 opposite the opening 33. The ridges 47 cross five of the ridges 48 and terminate in the ridge 48 closest to the end 31A the chamber 31. When the bulb is located in a T connection and inflated most of the expansion of the bulb will occur in the zone where the ridges 48 are located and thus the combination of the ridges 47 and 48 in this zone are needed in order to cause the bulb to return to its original shape upon deflation. There is less expansion of the bulb in the zone from lines 4—4 toward the neck 43 since a part of this portion of the bulb will be in the flange opening of the T and hence ridges 47 are sufficient in this zone of the chamber 31 to cause this portion of the bulb to return to its original shape before deflation.

The bulb 23 can be formed in different sizes. Its exterior is cylindrical in shape from the end 29B to about lines 4—4 and from about lines 4—4 to the end 29A, the bulb has the shape of half of a sphere. In one embodiment, the distance L is 4.75 inches; the outside diameter of cylinder proportion is 2.75 inches; D1 is equal to 0.81 of an inch and D2 is equal to 0.30 of an inch. The thickness T1 of the neck is equal to 0.1875 of an inch and the thickness T2 of the expandable wall portion 29 from 43B to the end 29A is equal to 0.100 of an inch The width D3 of the ridges 47 and 48 is equal to 0.100 of an inch and the distance of D4 that the ridges 47 and 48 extend inward is equal to about 0.040 of an inch. The diameter D5 is equal to 2.375 inches. Adjacent ridges 48 are located about 5/16 of an inch apart.

In a second embodiment, L is equal to 4 inches and the outside diameter of the cylindrical portion of the bulb is equal to 1.750 of an inch. In this second embodiment, only five equally spaced apart ridges 47 are employed. Six ridges 48 are employed. The dimensions T2, D3, and D4 of the second embodiment are the same as those of the first embodiment. D1 is equal to 0.81 of an inch; D2 is equal to 0.28 of an inch; D5 is equal to 1 inch and T1 is equal to 0.375 of an inch. In a third embodiment, L is equal to 3.25 inches and the outside diameter of the cylindrical portion of the bulb is equal to 1.300 inches. In this third embodiment, the dimensions T2, D3 and D4 are the same as those of the first embodiment. In the third embodiment, the bulb has only four equally spaced apart ridges 47. Five ridges 48 are employed. D1 is equal to 0.81 of an inch; D2 is equal to 0.160 of an inch; D5 is equal to 1 inch and T1 is equal to 150 of an inch. In a fourth embodiment, L is equal to 6.12 inches and the outside diameter of the cylindrical portion of the bulb is equal to 3.75 inches. In the fourth embodiment, the dimensions of T2, D3 and D4 are the same as those of the first embodiment. In the fourth embodiment, the bulb has ten equally spaced apart ridges 47. Six ridges 48 are employed. D1 is equal to 0.81 of an inch; D2 is equal to 0.56 of an inch; D5 is equal to 2.375 inches and T1 is equal to 0.1875 of an inch. In the second, third and fourth embodiments, the distance between adjacent ridges 48 is proportionally different. In the second, third and fourth embodiments, the ridges 47 extend from about the position 43A of the neck 43 to the other end 31A of the chamber opposite the opening 33 as described in connection with the embodiment of FIGS. 3 and 4. The different size bulbs are used for testing different size pipes for leaks. One size handle 25 is used for the bulbs of the first and fourth embodiments and a smaller size handle 25 is used for the bulbs of the second and third embodiments. In another embodiment the handle 25 may be formed completely of plastic except for a threaded end tube similar to 32A for holding the pneumatic valve. In this embodiment, the walls of the handle are thinner whereby a larger aperture 39 extends through the handle from the threaded tube to the end 25C. Although the test plug of the invention was described as being used in a test T, it is to be understood that it could be used in other applications.

I claim:
1. An apparatus for use for testing a fluid system comprising:
   an inflatable member comprising wall structure formed of flexible material defining a chamber with an opening leading to said chamber,
   means coupled to said opening to allow gas under pressure to be injected into said chamber by way of said opening to cause said member to inflate and subsequently to be released from said chamber by way of said opening to allow said member to deflate,
   the inside of said wall structure comprising a plurality of ridges of said flexible material projecting inward from the inside of said wall structure for causing said member to retain its original shape upon deflation thereof,
   said ridges comprise a plurality of ridges in spaced apart lines each of which extends from near said opening to the end of said chamber opposite said opening.
2. An apparatus for use for testing a fluid system, comprising:
   an inflatable member comprising wall structure formed of flexible material defining a chamber with an opening leading to said chamber,
   means coupled to said opening to allow gas under pressure to be injected into said chamber by way of said opening to cause said member to inflate and subsequently to be released from said chamber by way of said opening to allow said member to deflate,
   the inside of said wall structure comprising a plurality of ridges of said flexible material projecting inward form the inside of said wall structure for causing said member to retain its original shape upon deflation thereof,
   said ridges comprise two sets of ridges,
   one set of ridges are in spaced apart lines each of which extend from near said opening to the end of said chamber opposite said opening,
   the other set of ridges are in spaced apart lines each of which extends continuously around the inside of the wall structure of said member,
   a plurality of said ridges of said one set crossing a plurality of said ridges of said other set.
3. The apparatus of claim 2, wherein:
   said ridges of said other set are located near said end of said chamber opposite said opening.

4. An apparatus for use for testing a fluid system, comprising:
- an inflatable member comprising wall structure formed of flexible material defining a chamber with an opening leading to said chamber,
- a handle having an aperture formed therethough,
- said handle being coupled to said inflatable member with said aperture in fluid communication with said chamber by way of said opening to allow gas under pressure to be injected into said chamber by way of said aperture to cause said member to inflate and subsequently to be released from said chamber by way of said aperture to allow said member to deflate,
- the inside of said wall structure comprising a plurality of ridges of said flexible material projecting inward from the inside of said wall structure for causing said member to return to its original shape upon deflation thereof,
- said ridges comprise a plurality of ridges in spaced apart lines each of which extends from near said opening to the end of said chamber opposite said opening.

5. The apparatus of claim 4, wherein:
- said ridges comprise two sets of ridges,
- one set of ridges are in spaced apart lines each of which extend from near said opening to the end of said chamber opposite said opening,
- the other set of ridges are in spaced apart lines each of which extends continuously around the inside of the wall structure of said member,
- a plurality of said ridges of said one set crossing a plurality of said ridges of said other set.

6. The apparatus of claim 5, wherein:
- said ridges of said other set are located near said end of said chamber opposite said opening.

7. The apparatus of claim 6, wherein:
- one end of said handle is located within said opening.

8. The apparatus of claims 1, 2, 3, 4, 5, 6, or 7, wherein:
- said opening is the only opening leading to said chamber.

9. The apparatus of claim 5, wherein:
- said opening is the only opening leading to said chamber,
- said other set of ridges are located only near the end of said chamber opposite of said opening.

10. An apparatus for use for testing a fluid system, comprising:
- an inflatable member comprising a wall structure formed of flexible material defining a chamber with an opening leading to said chamber,
- means coupled to said opening to allow gas under pressure to be injected into said chamber by way of said opening to cause said member to inflate and subsequently to be released from said chamber by way of said opening to allow said member to deflate,
- the inside of said wall structure comprising a plurality of ridges of said flexible material projecting inward from the inside of said wall structure for causing said member to retain its original shape upon deflation thereof,
- said ridges comprise a plurality of ridges in spaced apart lines each of which extends continuously around the inside of the wall structure of said member,
- said opening is the only opening leading to said chamber
- said ridges are located only near the end of said chamber opposite said opening.

11. An apparatus for use for testing a fluid system, comprising:
- an inflatable member comprising wall structure formed of flexible material defining a chamber with an opening leading to said chamber,
- a handle having an aperture formed therethrough,
- said handle being coupled to said inflatable member with said aperture in fluid communication with said chamber by way of said opening to allow gas under pressure to be injected into said chamber by way of said aperture to cause said member to inflate and subsequently to be released from said chamber by way of said aperture to allow said member to deflate,
- the inside of said wall structure comprising a plurality of ridges of said flexible material projecting inward from the inside of said wall structure for causing said member to return to its original shape upon deflation thereof,
- said ridges comprise a plurality of ridges in spaced apart lines each of which extends continuously around the inside of the wall structure of said member,
- said opening is the only opening leading to said chamber,
- said ridges are located only near the end of said chamber opposite said opening.

* * * * *